United States Patent
Byun (10) Patent No.: US 11,216,384 B2
(45) Date of Patent: Jan. 4, 2022

(54) CONTROLLER, MEMORY SYSTEM AND OPERATING METHOD OF THE CONTROLLER

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 108 days.

(21) Appl. No.: 16/674,968

(22) Filed: Nov. 5, 2019

(65) Prior Publication Data

US 2020/0310982 A1 Oct. 1, 2020

(30) Foreign Application Priority Data

Mar. 28, 2019 (KR) .................. 10-2019-0035522

(51) Int. Cl.
*G06F 12/00* (2006.01)
*G06F 12/1009* (2016.01)
*G06F 12/02* (2006.01)

(52) U.S. Cl.
CPC ...... *G06F 12/1009* (2013.01); *G06F 12/0253* (2013.01); *G06F 2212/657* (2013.01)

(58) Field of Classification Search
CPC ............. G06F 12/1009; G06F 12/0253; G06F 12/0238; G06F 12/0246; G06F 12/10; G06F 2212/657
See application file for complete search history.

(56) References Cited

FOREIGN PATENT DOCUMENTS

| KR | 1020140057454 | 5/2014 |
|----|---------------|--------|
| KR | 101420754 | 7/2014 |
| KR | 1020160148952 | 12/2016 |
| KR | 1020170035155 | 3/2017 |

OTHER PUBLICATIONS

Wookhan Jeong et al., Improving Flash Storage Performance by Caching Address Mapping Table in Host Memory, Jul. 2017, 9th USENIX Workshop on Hot Topics in Storage and File Systems.*
Jeong, W et al., Improving Flash Storage Performance by Caching Address Mapping Table in Host Memory, Jul. 10-11, 2017, 9th USENIX Workshop on Hot Topics in Storage and File Systems (HotStorage'17), Santa Clara, CA.

* cited by examiner

*Primary Examiner* — Shawn X Gu
(74) *Attorney, Agent, or Firm* — IP & T Group LLP (57) ABSTRACT

Various embodiments generally relate to a semiconductor device, and more particularly, to a controller, a memory system and an operating method thereof. In accordance with an embodiment of the present disclosure, an operating method of a controller for controlling a nonvolatile memory device may include receiving a read command from a host; determining whether changed L2P map data corresponding to L2P map data included in the read command is registered in a dirty list; and performing, when the changed L2P map data is determined as registered in the dirty list, a read operation on the nonvolatile memory device based on the changed L2P map data among L2P map data included in a plurality of L2P segments.

20 Claims, 10 Drawing Sheets

| L2P Segment 0 | L2P Map data 0 |
| | L2P Map data 1 |
| | L2P Map data 2 |
| | ⋮ |
| | L2P Map data K |
| L2P Segment 1 | L2P Map data 0 |
| | L2P Map data 1 |
| | L2P Map data 2 |
| | ⋮ |
| | L2P Map data K |
| ⋮ | |
| L2P Segment L | L2P Map data 0 |
| | L2P Map data 1 |
| | L2P Map data 2 |
| | ⋮ |
| | L2P Map data K |

FIG.7B

| dirty list | |
|---|---|
| L2P Map data 1 | Segment 0 |
| L2P Map data 2 | Segment 0 |
| L2P Map data 3 | Segment 0 |
| L2P Map data 4 | Segment 0 |
| L2P Map data 5 | Segment 0 |
| L2P Map data 6 | Segment 0 |
| L2P Map data 0 | Segment 1 |
| L2P Map data 2 | Segment 1 |

FIG.7C

| Sync up list |
|---|
| L2P Segment 0 |
| L2P Segment 1 |

— CONTROLLER, MEMORY SYSTEM AND OPERATING METHOD OF THE CONTROLLER

CROSS-REFERENCES TO RELATED APPLICATION

The present application claims priority under 35 U.S.C. § 119(a) to Korean application number 10-2019-0035522, filed on Mar. 28, 2019, which is incorporated herein by reference in its entirety as set forth in full.

BACKGROUND

1. Technical Field

Various embodiments generally relate to a semiconductor device, and more particularly, to a controller, a memory system and an operating method thereof.

2. Related Art

Recently, the paradigm for the computing environment has changed to the ubiquitous computing environment in which computer systems can be used anytime and anywhere. Therefore, the use of portable electronic devices such as a mobile phone, digital camera and notebook computer has rapidly increased. Such a portable electronic device generally uses a memory system using a memory device. The memory system is used to store data used in the portable electronic device.

Since the memory system using a memory device has no mechanical driver, the data storage device has excellent stability and durability, exhibits high information access speed, and has low power consumption. Examples of the memory system having such advantages include a universal serial bus (USB) memory device, a memory card having various interfaces, a universal flash storage (UFS) device, and a solid state drive (SSD).

SUMMARY

In accordance with an embodiment of the present disclosure, an operating method of a controller for controlling a nonvolatile memory device may include: receiving a read command from a host; determining whether changed L2P map data corresponding to L2P map data included in the read command is registered in a dirty list; and performing, when the changed L2P map data is determined as registered in the dirty list, a read operation on the nonvolatile memory device based on the changed L2P map data among L2P map data included in a plurality of L2P segments.

In accordance with an embodiment of the present disclosure, a memory system may include: a nonvolatile memory device; and a controller configured to: receive a read command from a host, and determine whether changed L2P map data corresponding to L2P map data included in the read command is registered in a dirty list, and perform, when the changed L2P map data is determined as registered in the dirty list, a read operation on the nonvolatile memory device based on the changed L2P map data among L2P map data included in a plurality of L2P segments.

In accordance with an embodiment of the present disclosure, a data processing system may include: a memory device configured to store a set of L2P map segments; a controller configured to cache a first subset of the set; and a host configured to cache a second subset of the first subset, wherein the controller is further configured to: synchronize, with the host, a L2P map segment having a predetermined amount or greater of changed L2P map data within the second subset cached therein; control the memory device to perform an operation based on L2P map data included in a request from the host, the L2P map data being from the synchronized L2P map segment cached in the host; and control the memory device to perform an operation based on L2P map data from the first subset or the set, the L2P map data being within a non-synchronized L2P map segment.

BRIEF DESCRIPTION OF THE DRAWINGS

Features, aspects and embodiments are described in conjunction with the attached drawings, in which.

DETAILED DESCRIPTION

Hereinafter, a semiconductor apparatus according to the present disclosure will be described below with reference to the accompanying drawings through various embodiments.

Figure 1:
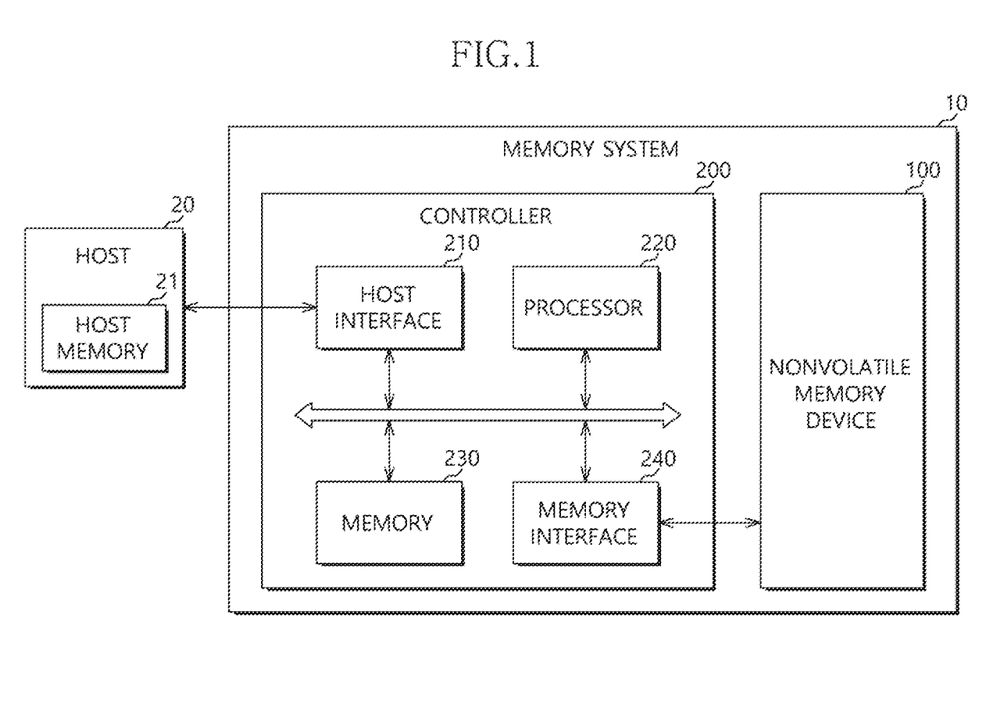
FIG. 1 is a diagram illustrating a configuration of a memory system in accordance with an embodiment of the present disclosure.

FIG. 1 is a diagram illustrating a configuration of a memory system 10 in accordance with an embodiment of the present disclosure. Referring to FIG. 1, the memory system 10 according to an embodiment may store data to be accessed by a host 20 such as a mobile phone, an MP3 player, a laptop computer, a desktop computer, a game player, a television (TV), an in-vehicle infotainment system, and the like.

The memory system 10 may be manufactured as any one among various types of storage devices according to an interface protocol coupled to the host 20. For example, the memory system 10 may be configured of any one of various types of storage devices, such as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-E), a compact flash (CF) card, a smart media card, a memory stick, and the like.

The memory system 10 may be manufactured as any one among various types of packages. For example, the memory system may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may operate as a storage medium of the memory system 10. According to a memory cell configuring the nonvolatile memory device 100, the nonvolatile memory device 100 may be implemented as one among various nonvolatile memory device such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound and so forth.

Although FIG. 1 exemplifies the memory system 10 including a single nonvolatile memory device 100 for clarity, the memory system may include a plurality of nonvolatile memory devices 100 and various embodiments of the present disclosure may be applied to the memory system 10 including the plurality of nonvolatile memory devices 100.

The nonvolatile memory device 100 may include a memory cell array (not shown) including a plurality of memory cells arranged at cross points between a plurality of word lines (not shown) and a plurality of bit lines (not shown). The memory cell array may include a plurality of memory blocks each including a plurality of pages.

For example, each of the memory cells in the memory cell array may be a single level cell (SLC) in which 1-bit data is to be stored and a multi level cell (MLC) in which 2-bit or greater is to be stored. A memory cell in which 2-bit data is to be stored may be referred to as a multi-level cell (MLC), a memory cell in which 3-bit data is to be stored may be referred to as a triple level cell (TLC), and a memory cell in which 4-bit data is to be stored may be referred to as a quadruple level cell (QLC). However, for clarity, the memory cells in which the 2-bit or greater are to be stored may be collectively referred to as the MLC in the description.

The memory cell array may include at least one of the SLC and the MLC. The memory cell array may include memory cells arranged in a two-dimensional (e.g., horizontal) structure or memory cells arranged in a 3D vertical structure.

The controller 200 may control general operations of the memory system 10 through drive of firmware or software loaded in the memory 230. The controller 200 may decode and drive instructions or algorithms of a code type such as firmware or software. The controller 200 may be implemented as hardware or combination of hardware and software. Although not illustrated in FIG. 1, the controller 200 may further include an error correction code (ECC) engine configured to generate a parity by ECC-encoding write data provided from the host and to ECC-decode read data read from the nonvolatile memory device 100 using the parity.

The controller 200 may include a host interface 210, a processor 220, a memory 230, and a memory interface 240.

The host interface 210 may perform interfacing between the host 20 and the memory system 10 according to a protocol of the host 20. For example, the host interface 210 may communicate with the host 20 through any one among a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-E) protocol.

The processor 220 may comprise a micro control unit (MCU) and a central processing unit (CPU). The processor 220 may process requests transmitted from the host 20. To process the requests transmitted from the host 20, the processor 220 may drive a code-typed instruction or algorithm (for example, firmware) loaded into the memory 230 and control internal function blocks such as the host interface 210, the memory 230, the memory interface 240 and the nonvolatile memory device 100.

The processor 220 may generate control signals for controlling operations of the nonvolatile memory device 100 based on the requests transmitted from the host 20 and may provide the generated control signals to the nonvolatile memory device 100 through the memory interface 240.

When the nonvolatile memory device 100 is implemented as a flash memory device, the processor 220 may drive software referred to as a flash translation layer (FTL) in order to control a unique operation of the nonvolatile memory device 100 and provide device compatibility to the host 20. As the FTL is driven, the host 20 may recognize and use the memory system 10 as a general storage device such as a hard disk.

The memory 230 may be configured as a read only memory (ROM) and a random access memory such as a dynamic random access memory (DRAM) or a static random access memory (SRAM). The memory 230 may store the firmware to be driven by the processor 220.

The memory 230 may also store data (for example, meta data) required for driving of the firmware. For example, the memory 230 may operate as a working memory of the processor 220.

The memory 230 may be configured to include a data buffer configured to temporarily store write data to be transmitted to the nonvolatile memory device 100 from the host 20 or read data to be transmitted to the host 20 from the nonvolatile memory device 100. For example, the memory 230 may operate as a buffer memory of the processor 220.

It will be obvious to those skilled in the art that the memory 230 may also include regions used for various purposes such as a region used as a write data buffer in which write data is to be temporarily stored, a region used as a read data buffer in which read data is to be temporarily stored, and a region used as a map cache buffer in which map data is to be cached.

Also, the memory 230 may store system data or meta data.

The memory interface 240 may control the nonvolatile memory device 100 according to control of the processor 220. The memory interface 240 may also be referred to as a memory controller. The memory interface 240 may provide control signals to the nonvolatile memory device 100. The control signals may include a command, an address, and an operation control signal for controlling the nonvolatile memory device 100. The memory interface 240 may provide the nonvolatile memory device 100 with data stored in the data buffer or store data transmitted from the nonvolatile memory device 100 in the data buffer.

The host 20 may include a host memory 21. In accordance with an embodiment of the present disclosure, operation performance of the memory system 10 may be improved by using the host memory 21 of the host 20, as described hereinafter.

Figure 2:
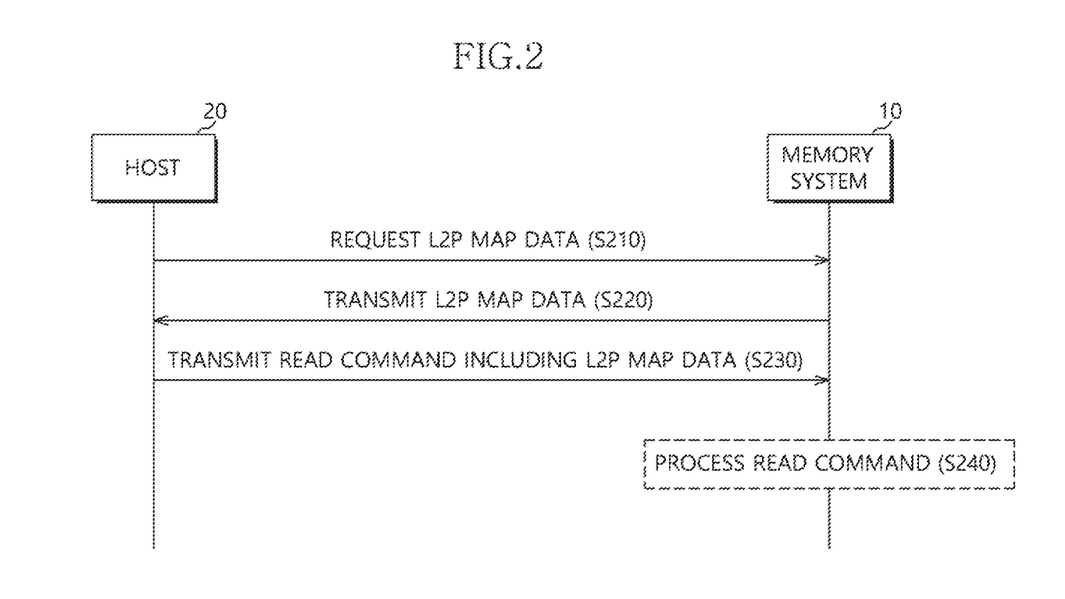
FIG. 2 is a diagram illustrating a memory system using a memory resource of a host in accordance with an embodiment of the present disclosure.

FIG. 2 is a diagram illustrating a memory system using a memory resource of a host in accordance with an embodiment of the present disclosure.

Referring to FIG. 2, in step S210, the host 20 may request, from the memory system 10, a whole or a part of a plurality of logical-to-physical (L2P) map data stored in the memory system 10.

The L2P map data may be data indicating a mapping relationship between a logical address used by the host 20 and a physical address used by the controller 200 in order to access data stored in the nonvolatile memory device 100. The logical address may be a logical page number LPN set on a page basis, a logical block address LBA set on a smaller basis than the page basis and so forth. The physical address may be a physical page number PPN set on a page basis and a physical block address PBN set on a smaller basis than the page basis and so forth.

In an embodiment the host 20 may request, when a booting operation of the memory system 10 is completed, the L2P map data from the memory system 10.

In an embodiment, the host 20 may request, from the memory system 10, L2P map data corresponding to a specific workload among a plurality of pieces of L2P map data stored in the memory system 10.

In an embodiment, the host 20 may request, from the memory system 10, a whole or a part of a plurality of pieces of L2P map data stored in the nonvolatile memory device 100.

In an embodiment, the host 20 may request, from the memory system 10, a whole or a part of a plurality of pieces of L2P map data stored in the memory 230 of the controller 200.

In step S220, the memory system 10 may transmit, to the host 20, a whole or a part of L2P map data requested by the host 20.

In an embodiment, the memory 230 of the controller 200 may include a DRAM configured to store a plurality of pieces of L2P map data received from the nonvolatile memory device 100 and a SRAM configured to cache a whole or a part of the plurality of pieces of L2P map data stored in the DRAM.

In an embodiment, the memory system 10 may transmit, to the host 20, a whole or a part of the plurality of pieces of L2P map data stored in the memory 230 of the controller 200.

In an embodiment, the memory system 10 may read a whole or a part of the plurality of pieces of L2P map data stored in the nonvolatile memory device 100 and may transmit the read pieces of L2P map data to the host 20.

The host 20 may receive the L2P map data from the memory system 10 and may cache the received L2P map data into the host memory 21.

In step S230, when data stored in the memory system 10 is required, the host 20 may generate a read command and may transmit the generated read command to the memory system 10. The read command may include L2P map data as address information, which corresponds to the required data, among the L2P map data cached in the host memory 21.

In step S240, the memory system 10 may receive the read command and may perform a read operation of reading the data stored in the nonvolatile memory device 100 according to the received read command.

In an embodiment, the memory system 10 may read the data stored in the nonvolatile memory device 100 based on the L2P map data included in the read command.

In an embodiment, the memory system 10 may read the data stored in the nonvolatile memory device 100 based on the L2P map data cached in the memory 230 instead of the L2P map data included in the read command.

That is, the memory system 10 may cache the L2P map data into the host memory 21 of a relatively large storage capacity and may process the read command according to the L2P map data cached in the host memory 21. Therefore, the memory system 10 may be improved in operation performance since the storage capacity of the memory 230 for caching the L2P map data into the memory system 10 can be saved and there is no need of referring to the L2P map data cached in the memory system 10 when processing the read command.

FIG. 2 has been described with the L2P map data taken as an example. However, it is obvious that the L2P map data can be cached into the host memory 21 by a unit of a L2P segment including a plurality of pieces of L2P map data.

Figure 3:
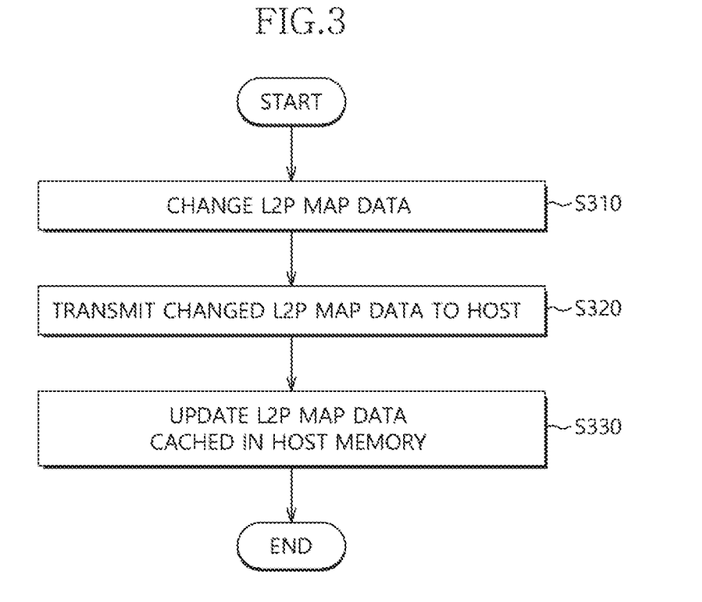
FIGS. 3 and 4 are diagrams illustrating an operation of a memory system in accordance with an embodiment of the present disclosure.
Figure 4:
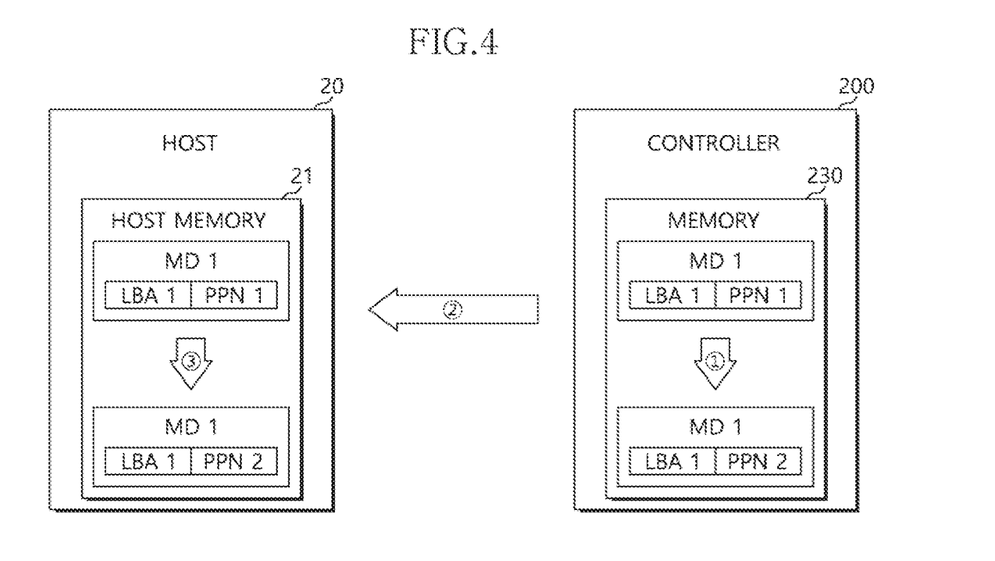

FIGS. 3 and 4 are diagrams illustrating an operation of a memory system in accordance with an embodiment of the present disclosure. FIG. 4 illustrates L2P map data MD1 stored in the memory 230 and cached in the host memory 21. The L2P map data MD1 may include a logical block address LBA1 and a physical page number PPN1 mapped to the logical block address LBA1.

Referring to FIGS. 3 and 4, in step S310, the memory system may change the L2P map data MD1 stored in the memory 230. For example, the controller 200 may store data, which is originally stored in a storage location indicated by the physical page number PPN1, into a storage location indicated by a physical page number PPN2 by performing an operation which causes a map data change event such as a garbage collection operation, a read reclaim operation, data update operation and so forth. As illustrated in FIG. 4, the mapping relationship of the L2P map data MD1 may change since the physical page number PPN1, which is mapped to the logical block address LBA1 in the L2P map data MD1, is changed to the physical page number PPN2 (①). Since the logical block address LBA1 of the L2P map data MD1 cached in the host memory 21 still has the mapping relationship with the physical page number PPN1, a sync-up operation is required to be performed to synchronize the L2P map data MD1 cached in the host memory 21 to the changed L2P map data MD1 stored in the controller 200.

In an embodiment, the memory system 10 may inform the host 20 of the change of the L2P map data MD1.

In an embodiment, the host 20 may request, from the memory system 10, sync-up of the L2P map data MD1 cached in the host memory 21.

In an embodiment, the host 20 may transmit, when informed of the change of the L2P map data MD1 by the memory system 10, a sync-up request to the memory system 10.

In step S320 the memory system 10 may transmit, when the sync-up request is received from the host 20, the changed L2P map data to the host 20. That is, as illustrated in FIG. 4, the controller 200 may transmit the L2P map data MD1 stored in the memory 230 to the host 20 (②).

In step S330, the host 20 may receive the changed L2P map data MD1 from the controller 200. The host 20 may update the L2P map data MD1 cached in the host memory 21 based on the changed L2P map data MD1 (③). That is, the mapping relationship represented by the L2P map data MD1 cached in the host memory 21 may be changed such that the physical page number PPN1 mapped to the logical block address LBA1 is changed to the physical page number PPN2.

FIGS. 3 and 4 have been described with the L2P map data taken as an example. However, it is obvious that the update in the host memory 21 may be performed by a unit of a L2P segment including a plurality of pieces of L2P map data.

Figure 5:
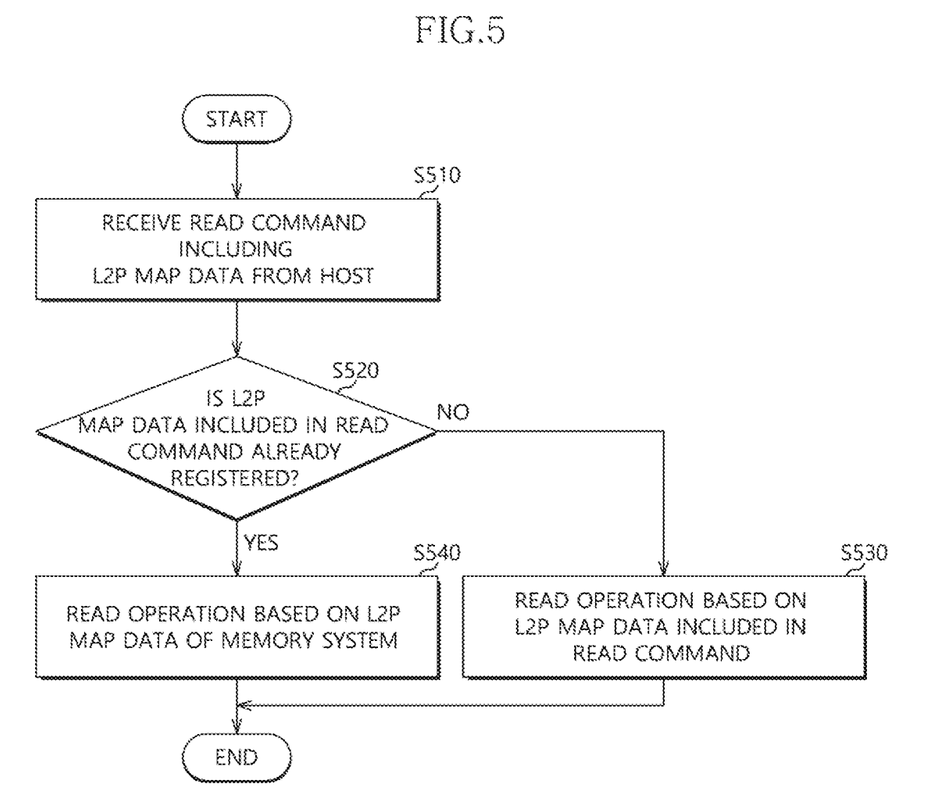
FIG. 5 is a diagram illustrating an operation of a memory system in accordance with an embodiment of the present disclosure.

FIG. 5 is a diagram illustrating an operation of a memory system in accordance with an embodiment of the present disclosure.

Referring to FIG. 5, in step S510, the memory system 10 may receive a read command. For example, the controller 200 may receive the read command from the host 20 and the read command may include L2P map data corresponding to data to be read. That is, the host 20 may read, from the host memory 21, the L2P map data including information of an address corresponding to the data to be read; may include the read L2P map data into the read command; and may transmit the read command to the memory system 10.

In step S520, the memory system 10 may determine whether the L2P map data included in the read command is already registered in a dirty list. For example, the controller 200 may determine whether the L2P map data included in the read command is already registered in the dirty list. The dirty list may include L2P map data changed within the memory system 10 after being transmitted to the host 20.

In step S530, when the L2P map data included in the read command is not registered in the dirty list (S520—NO), the memory system 10 may perform a read operation based on the L2P map data included in the read command. For example, the controller 200 may perform a read operation on the nonvolatile memory device 100 based on the L2P map data included in the read command. This is because the L2P map data included in the read command and not registered in the dirty list, is the L2P map data that is not changed within the memory system 10 after being transmitted to the host 20.

In step S540, when the L2P map data included in the read command is registered in the dirty list (S520—YES), the memory system 10 may perform a read operation without utilizing the L2P map data included in the read command. For example, the controller 200 may perform a read operation on the nonvolatile memory device 100 based on L2P map data included in a plurality of L2P segments that are read from the nonvolatile memory device 100. This is because the L2P map data included in the read command and registered in the dirty list is the L2P map data that is changed within the memory system 10 after being transmitted to the host 20 and thus the L2P map data provided from the host 20 is not reliable.

Figure 6:
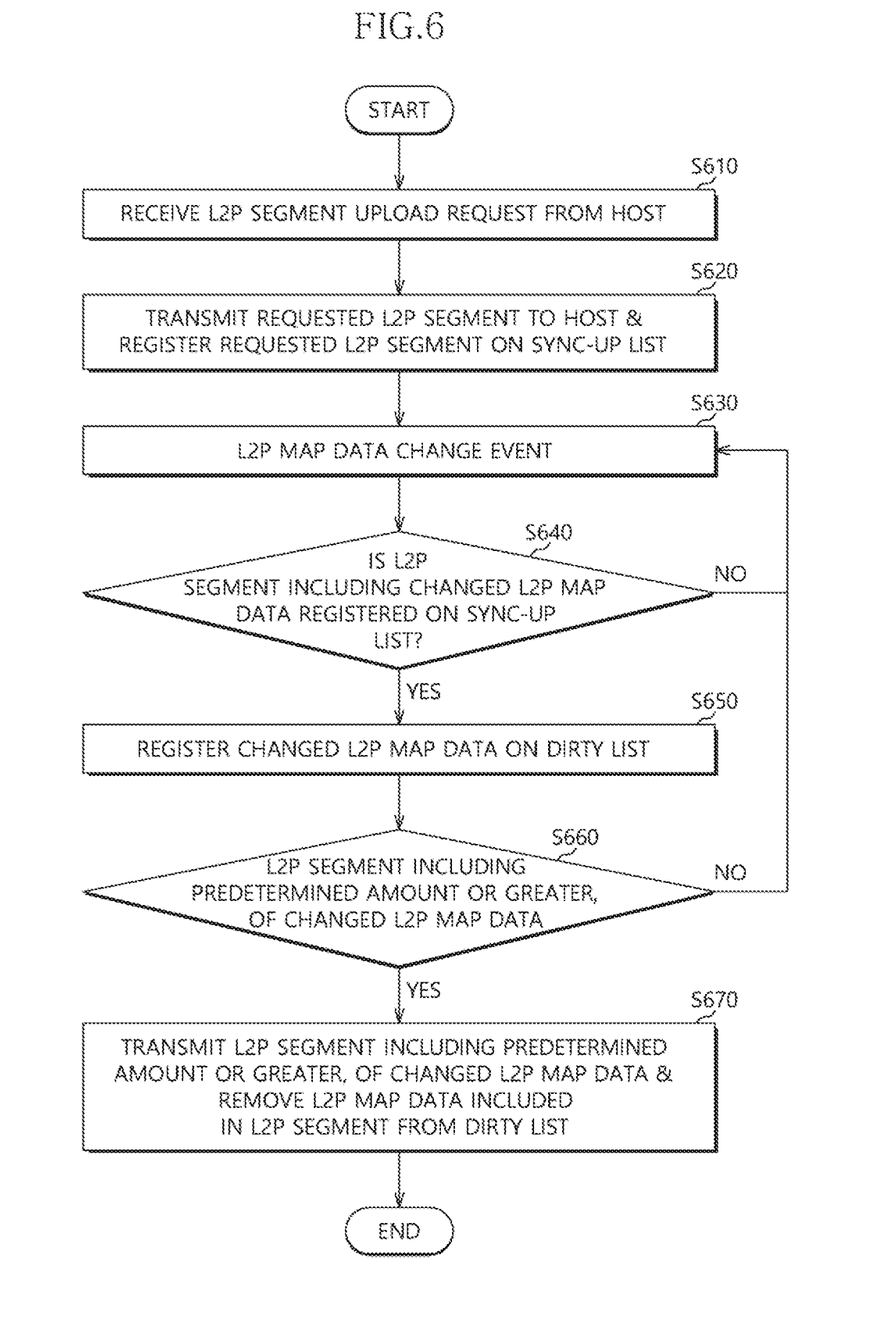
FIG. 6 is a diagram illustrating an operation of a memory system in accordance with an embodiment of the present disclosure.

FIG. 6 is a diagram illustrating an operation of the memory system 10 in accordance with an embodiment of the present disclosure.

Referring to FIG. 6, in step S610, the memory system 10 may receive a L2P segment upload request. For example, the controller 200 may receive, from the host 20, the L2P segment upload request of requesting mapping information of the memory system 10. The L2P segment upload request may request a L2P segment that is not currently cached in the host memory 21 or that is not yet transmitted from the controller 200 to the host 20.

In step S620, the memory system 10 may transmit at least one L2P segment to the host 20. For example, the controller 200 may transmit the requested L2P segment to the host 20 in response to the L2P segment upload request from the host 20. Also, the controller 200 may register the transmitted L2P segment in a sync-up list. The host may cache, into the host memory 21, the L2P segment received from the memory system 10.

In an embodiment, the controller 200 may register, in the sync-up list, an index of the transmitted L2P segment.

In an embodiment, the controller 200 may store the sync-up list in the memory 230.

In an embodiment, the controller 200 may read out a plurality of L2P segments stored in the nonvolatile memory device 100; and may transmit, to the host 20, at least one L2P segment in response to the L2P segment upload request from the host 20 among the plurality of L2P segments read out from the nonvolatile memory device 100.

In an embodiment, the controller 200 may transmit, to the host 20, L2P segments in response to the L2P segment upload request from the host 20 among a plurality of L2P segments stored in the memory 230.

In step S630, the memory system 10 may change a L2P map data. For example, the controller 200 may change a L2P map data due to a write operation, a garbage collection operation, a wear-levelling operation, a read reclaim operation and so forth. Such a L2P map data change event may cause change of a physical address mapped to a logical address within the L2P map data.

In step S640, the memory system 10 may determine whether a L2P segment including the changed L2P map data is already registered in the sync-up list. For example, the controller 200 may determine, when the L2P map data change event occurs in step S630, whether an index of a L2P segment including the changed L2P map data is registered in the sync-up list.

The controller 200 may proceed to step S630 when a L2P segment including the changed L2P map data is not registered in the sync-up list.

In step S650, when an index of a L2P segment including the changed L2P map data is determined to be already registered in the sync-up list (S650—YES), the memory system 10 may register the changed L2P map data of step S630 in the dirty list. For example, the controller 200 may register the changed L2P map data in the dirty list.

The controller 200 may proceed to step S630 when an index of a L2P segment including the changed L2P map data is determined to be not registered in the sync-up list (S650—NO).

In an embodiment, the controller 200 may register the changed L2P map data in the dirty list by mapping an index of the changed L2P map data to the index of the L2P segment including the changed L2P map data.

In an embodiment, the controller 200 may store the dirty list in the memory 230.

In step S660, the memory system 10 may detect a L2P segment including a predetermined amount or greater, of changed L2P map data. For example, the controller 200 may detect, based on the dirty list, at least one L2P segment including the predetermined amount or greater of changed L2P map data among the L2P segments registered in the sync-up list.

The controller 200 may proceed to step S630 when a L2P segment including a predetermined amount or greater of changed L2P map data is not detected.

In step S670, when a L2P segment including a predetermined amount or greater of changed L2P map data is detected (S660—YES), the memory system 10 may transmit the detected L2P segment to the host 20. For example, the controller 200 may transmit, to the host 20, the detected L2P segment including a predetermined amount or greater of changed L2P map data among the L2P segments registered in the sync-up list. The host 20 may receive, from the memory system 10, the L2P segment including a predetermined amount or greater of changed L2P map data and may update the L2P segments already cached in the host memory 21 based on the received L2P segment including a predetermined amount or greater of changed L2P map data. Therefore, the L2P segments of the memory system 10 and the L2P segments of the host memory 21 may be synchronized with each other. The controller 200 may remove, from the dirty list, the changed L2P map data included in the L2P segment transmitted to the host 20.

Therefore, as the predetermined amount becomes greater, a number of times of operations which transmit a L2P segment from the memory system 10 to the host 20 for synchronization between the L2P segment of the memory system 10 and the L2P segment cached in the host memory 21, may be reduced. Therefore, when the predetermined amount is properly adjusted, it may be possible for the memory system to effectively operate.

Figure 7A:
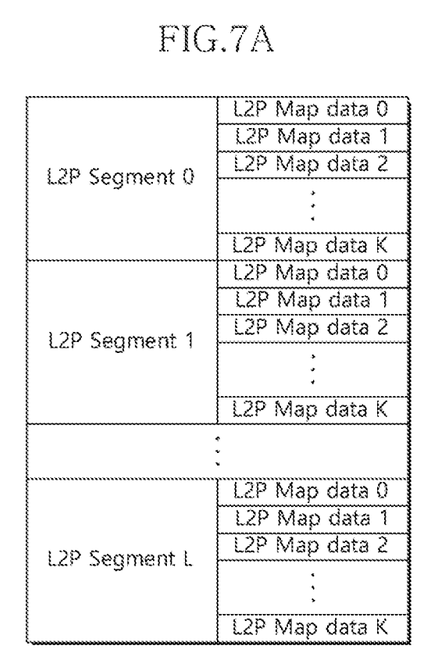
FIG. 7A is a diagram illustrating a plurality of L2P segments in accordance with an embodiment of the present disclosure.

FIG. 7A is a diagram illustrating a plurality of L2P segments L2P Segment 0 to L2P Segment L read out from the nonvolatile memory device 100.

Figure 7B:
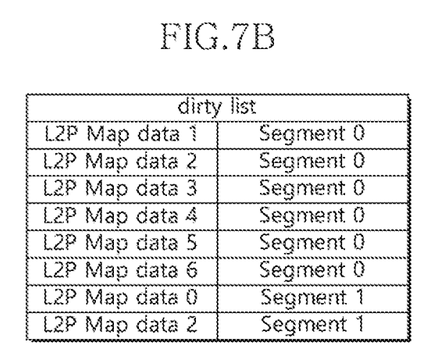
FIG. 7B is a diagram illustrating a dirty list in accordance with an embodiment of the present disclosure.

FIG. 7B is a diagram illustrating the sync-up list, in which indexes of the L2P segments L2P Segment 0 and L2P Segment 1 are registered, the L2P segments L2P Segment 0 and L2P Segment 1 being transmitted to the host 20 among the plurality of L2P segments L2P Segment 0 to L2P Segment L illustrated in FIG. 7A in response to the L2P segment upload request of the host 20.

Figure 7C:
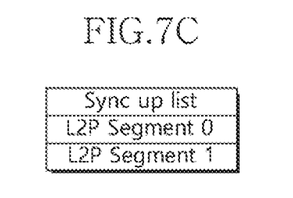
FIG. 7C is a diagram illustrating a sync-up list in accordance with an embodiment of the present disclosure.

FIG. 7C is a diagram illustrating the dirty list, in which each piece of the L2P map data changed due to the L2P map data change event is registered among the L2P map data included in the L2P segments of the sync-up list illustrated in FIG. 7B, the registered pieces of the changed L2P map data being mapped to the indexes of the L2P segments including the registered pieces of the changed L2P map data, respectively.

Figure 8:
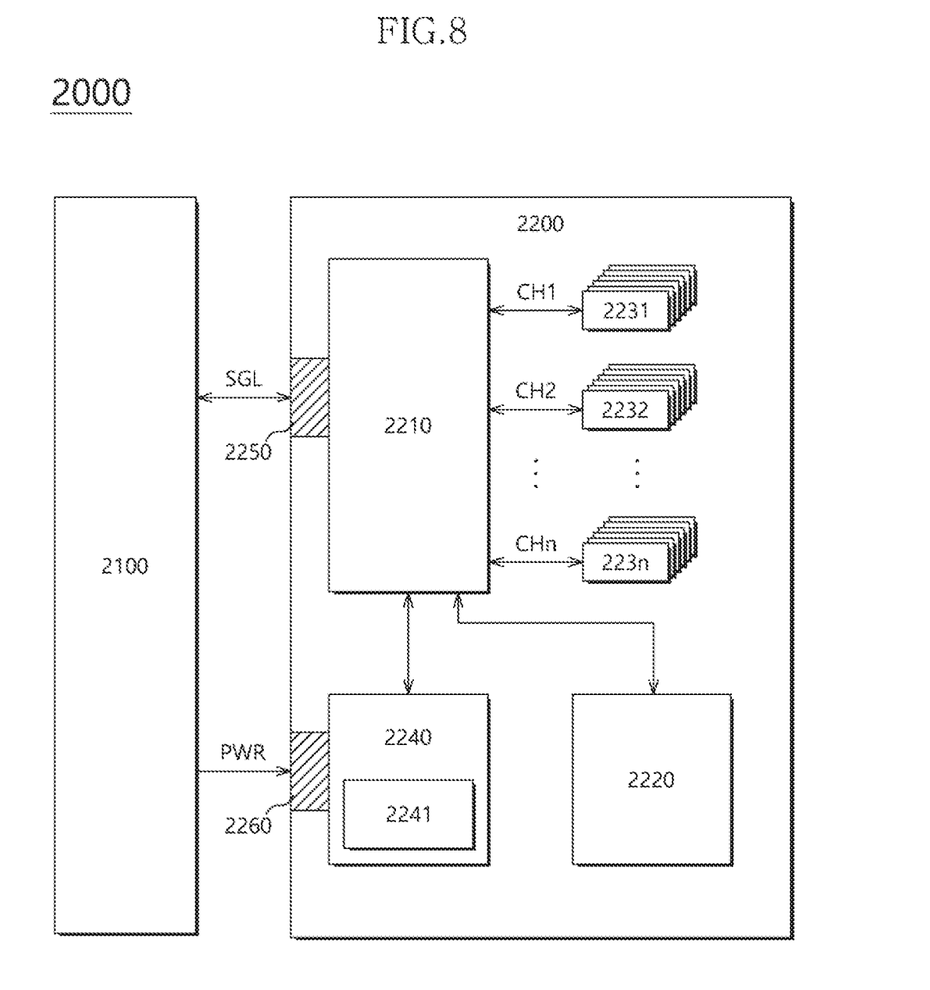
FIG. 8 is a diagram illustrating a configuration of a data processing system including a solid state drive (SSD) in accordance with an embodiment of the present disclosure.

FIG. 8 is a diagram illustrating a configuration of a data processing system including a solid state drive (SSD) in accordance with an embodiment of the present disclosure. Referring to FIG. 8, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200. The controller 2210 may be implemented and operate in the substantially same way as the controller 100 of FIG. 1.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1 to CHn, respectively. One or more nonvolatile memory devices may be coupled to a single channel. The nonvolatile memory devices coupled to the single channel may be coupled to the same signal bus and data bus.

The power supply 2240 may provide the inside of the SSD 2200 with power PWR inputted through the power connector 2260. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

Figure 9:
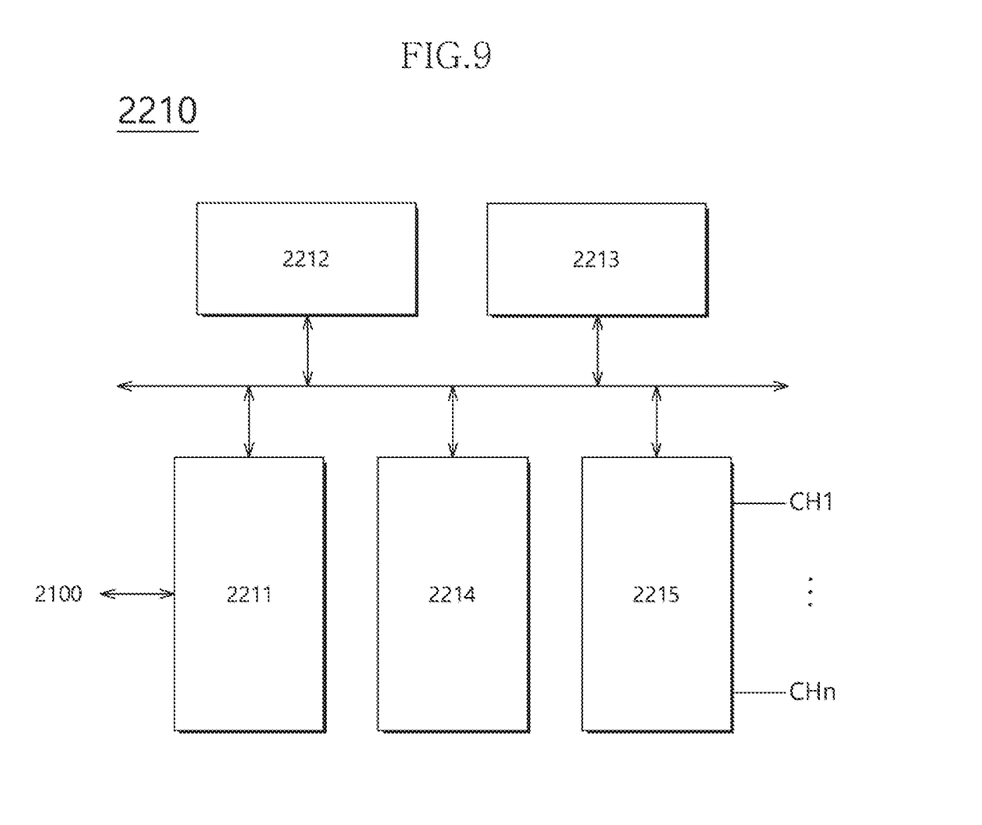
FIG. 9 is a diagram illustrating a configuration of a controller illustrated in FIG. 8.

The controller 2210 may exchange a signal SGL with the host 2100 through the signal connector 2250. The signal SGL may include a command, an address, data, and the like. The signal connector 2250 may be configured of various types of connectors according to an interface scheme between the host 2100 and the SSD 2200. [00104] FIG. 9 is a diagram illustrating a configuration of the controller illustrated in FIG. 8. Referring to FIG. 9, the controller 2210 may include a host interface unit 2211, a control unit 2212, a random access memory 2213, an error correction code (ECC) unit 2214, and a memory interface unit 2215.

The host interface unit 2211 may perform interfacing between the host 2100 and the SSD 2200 according to a protocol of the host 2100. For example, the host interface unit 2211 may communicate with the host 2100 through any one among protocols of secure digital (SD), universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-E), universal flash storage (UFS) and so forth. In addition, the host interface unit 2211 may perform a disk emulating function of supporting the host 2100 to recognize the SSD 2200 as a general-purpose memory system, for example, a hard disk drive (HDD).

The control unit 2212 may parse and process the signal SGL provided from the host 2100. The control unit 2212 may control operations of internal function blocks according to firmware or software for driving the SSD 2200. The random access memory 2213 may operate as a working memory for driving such firmware or software.

The ECC unit 2214 may generate parity data for data to be transmitted to the nonvolatile memory devices 2231 to 223n. The generated parity data may be stored, along with the data, in the nonvolatile memory devices 2231 to 223n, The ECC unit 2214 may detect errors of data read out from the nonvolatile memory devices 2231 to 223n based on the parity data. When the detected errors are within a correctable range, the ECC unit 2214 may correct the detected errors.

The memory interface unit 2215 may provide control signals such as commands and addresses to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read out from the nonvolatile memory devices 2231 to 223n to the buffer memory device 2220.

Figure 10:
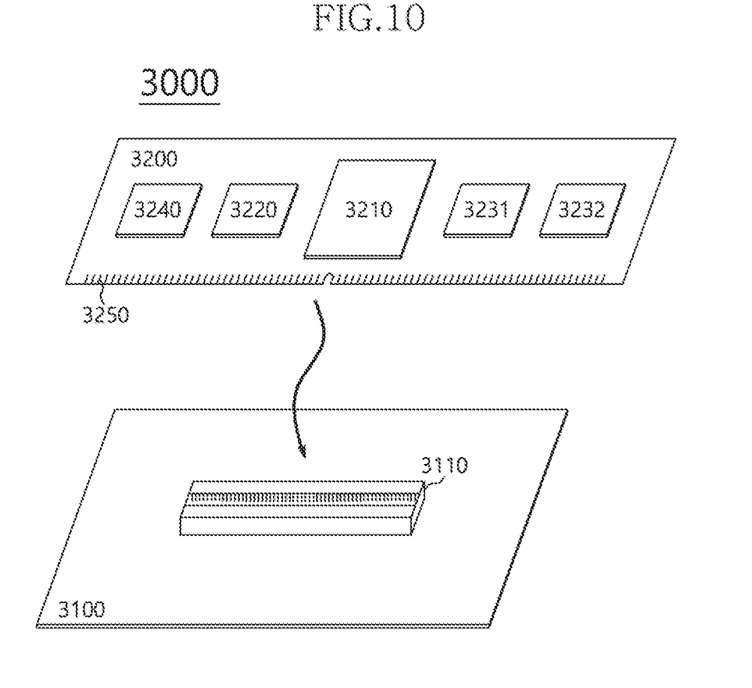
FIG. 10 is a diagram illustrating a configuration of a data processing system including a memory system in accordance with an embodiment of the present disclosure.

FIG. 10 is a diagram illustrating a configuration of a data processing system including a memory system in accordance with an embodiment of the present disclosure. Referring to FIG. 10, a data processing system 3000 may include a host 3100 and a memory system 3200.

The host 3100 may be configured in the form of a board such as a printed circuit board. Although not shown in FIG. 10, the host 3100 may include internal function blocks for performing functions of a host.

The host 3100 may include a connection terminal 3110 such as a socket, a slot, or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the memory system 3200. The controller 3210 may be configured in substantially same manner as the controller 2210 shown in FIG. 9.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide the inside of the memory system 3200 with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, data and the like, and power may be transferred between the host 3100 and the memory system 3200. The connection terminal 3250 may be configured as various types depending on an interface scheme between the host 3100 and the memory system 3200. The connection terminal 3250 may be disposed on any one side of the memory system 3200.

Figure 11:
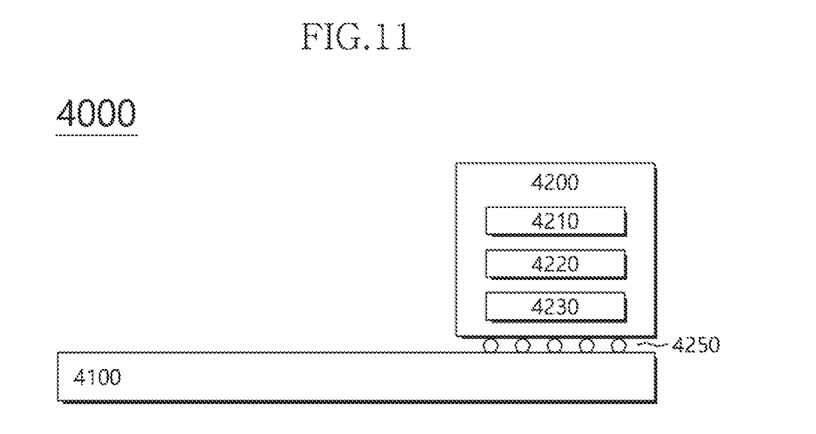
FIG. 11 is a diagram illustrating a configuration of a data processing system including a memory system in accordance with an embodiment of the present disclosure.

FIG. 11 is a diagram illustrating a configuration of a data processing system including a memory system in accordance with an embodiment of the present disclosure. Referring to FIG. 11, the data processing system 4000 may include a host 4100 and a memory system 4200.

The host 4100 may be configured in the form of a board such as a printed circuit board. Although not shown in FIG. 11, the host 4100 may include internal function blocks for performing functions of a host.

The memory system 4200 may be configured in the form of a package of a surface-mounting type. The memory system 4200 may be mounted on the host 4100 through solder balls 4250. The memory system 4200 may include a controller 4210, a buffer memory device 4220, and a nonvolatile memory device 4230.

The controller 4210 may control an overall operation of the memory system 4200. The controller 4210 may be configured in substantially same manner as the controller 2210 shown in FIG. 9.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 12:
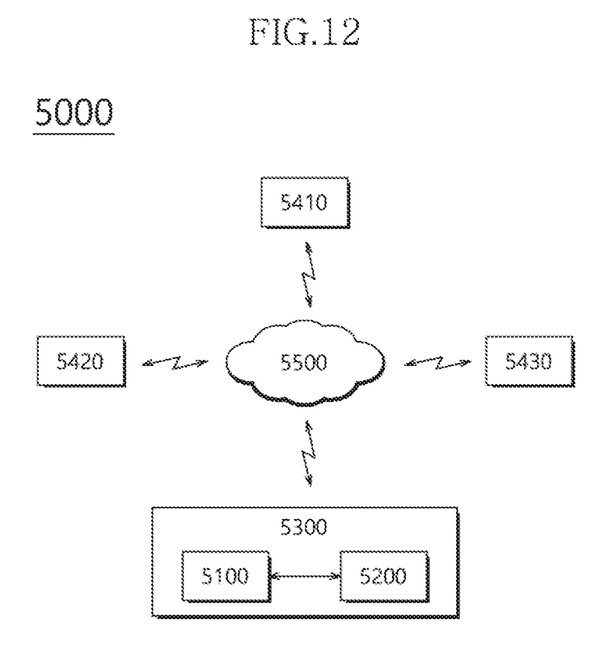
FIG. 12 is a diagram illustrating a configuration of a network system including a memory system in accordance with an embodiment of the present disclosure.

FIG. 12 is a diagram illustrating a configuration of a network system 5000 including a memory system in accordance with an embodiment of the present disclosure. Referring to FIG. 12, the network system 5000 may include a server system 5300 and a plurality of client systems 5410 to 5430 which are electrically coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured as the memory system 10 illustrated in FIG. 1, the memory system 2200 illustrated in FIG. 9, the memory system 3200 illustrated in FIG. 10, or the memory system 4200 illustrated in FIG. 11.

Figure 13:
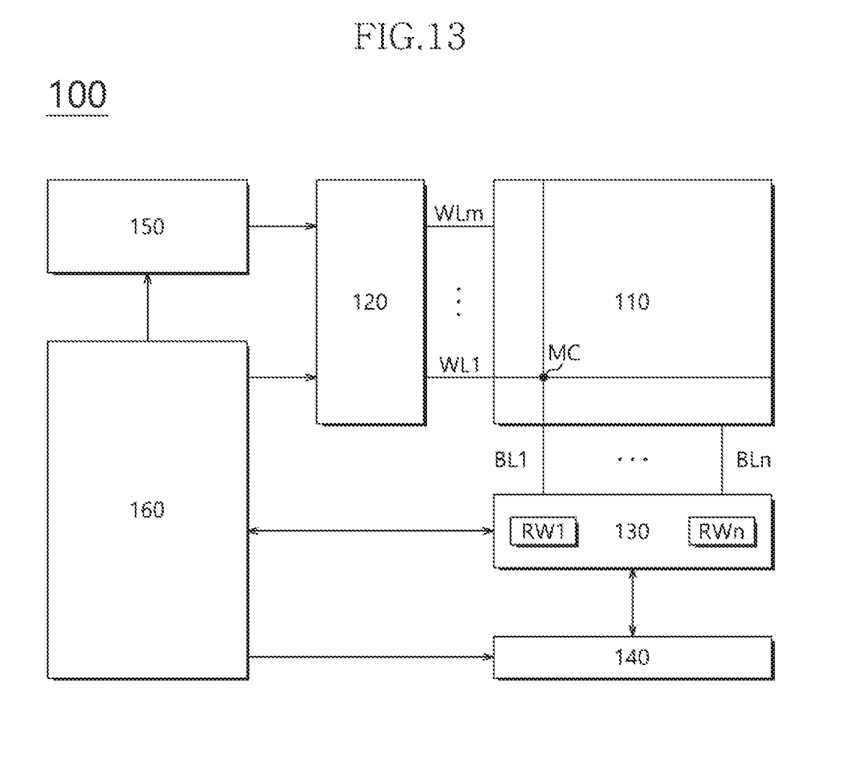
FIG. 13 is a diagram illustrating a configuration of a nonvolatile memory device included in a memory system in accordance with an embodiment of the present disclosure.

FIG. 13 is a diagram illustrating a configuration of a nonvolatile memory device 100 included in a memory system in accordance with an embodiment of the present disclosure. Referring to FIG. 13, the nonvolatile memory device 100 may include a memory cell array 110, a row decoder 120, a column decoder 130, a data read/write block 140, a voltage generator 150, and a control logic 160.

The memory cell array 110 may include memory cells MC arranged at cross points between word lines WL1 to WLm and bit lines BL1 to BLn.

The row decoder 120 may be coupled with the memory cell array 110 through the word lines WL1 to WLm. The row decoder 120 may operate according to control of the control logic 160. The row decoder 120 may decode an address provided from an external device (not shown). The row decoder 120 may select and drive the word lines WL1 to WLm based on a decoding result. For instance, the row decoder 120 may provide the word lines WL1 to WLm with a word line voltage provided from the voltage generator 150.

The data read/write block 140 may be coupled with the memory cell array 110 through the bit lines BL1 to BLn. The data read/write block 140 may include read/write circuits RW1 to RWn respectively corresponding to the bit lines BL1 to BLn. The data read/write block 140 may operate according to control of the control logic 160. The data read/write block 140 may operate as a write driver or a sense amplifier according to an operation mode. For example, the data read/write block 140 may operate as a write driver configured to store data provided from the external device in the memory cell array 110 during a write operation. For another example, the data read/write block 140 may operate as a sense amplifier configured to read out data from the memory cell array 110 during a read operation.

The column decoder 130 may operate according to control of the control logic 160. The column decoder 130 may decode an address provided from the external device. Based on a decoding result, the column decoder 130 may couple the read/write circuits RW1 to RWn of the data read/write block 140, which respectively correspond to the bit lines BL1 to BLn, with data input/output lines or data input/output buffers.

The voltage generator 150 may generate voltages to be used in internal operations of the nonvolatile memory device 100. The voltages generated by the voltage generator 150 may be applied to the memory cells of the memory cell array 110. For example, a program voltage generated during a program operation may be applied to a word line of memory cells for which the program operation is to be performed. For another example, an erase voltage generated during an erase operation may be applied to a well area of memory cells for which the erase operation is to be performed. For still another example, a read voltage generated during a read operation may be applied to a word line of memory cells for which the read operation is to be performed.

The control logic 160 may control general operations of the nonvolatile memory device 100 based on control signals provided from the external device. For example, the control logic 160 may control operations of the nonvolatile memory device 100 such as read, write and erase operations of the nonvolatile memory device 100.

While certain embodiments have been described above, it will be understood to those skilled in the art that the embodiments described are by way of example only. Accordingly, the controller, memory system and operating method thereof should not be limited based on the described embodiments. Rather, the controller, memory system and operating method thereof described herein should only be limited in light of the claims that follow when taken in conjunction with the above description and accompanying drawings.

What is claimed is:

1. An operating method of a controller for controlling a nonvolatile memory device, the operating method comprising:
   registering logical-to-physical (L2P) map data changed due to an L2P map data change event in a dirty list when the L2P map data is included in one or more L2P segments registered in a sync-up list;
   receiving a read command from a host;
   determining whether L2P map data included in the read command is registered in the dirty list; and
   performing, when the L2P map data included in the read command is determined as registered in the dirty list, a read operation on the nonvolatile memory device based on changed L2P map data among L2P map data included in a plurality of L2P segments.

2. The operating method of claim 1, further comprising:
   registering, in the sync-up list, at least one L2P segment that is transmitted to the host among the plurality of L2P segments each including a plurality of pieces of L2P map data in response to an L2P segment upload request from the host.

3. The operating method of claim 2, further comprising:
   determining, based on the dirty list, an L2P segment including a predetermined amount or greater of changed L2P map data among the one or more L2P segments registered in the sync-up list;
   transmitting at least one L2P segment, which is determined to include the predetermined amount or greater of changed L2P map data, to the host in response to a sync-up request of the host; and
   removing, from the dirty list, the changed L2P map data included in the at least one L2P segment transmitted to the host in response to the sync-up request.

4. The operating method of claim 2, further comprising:
   receiving the L2P segment upload request from the host; and
   transmitting, to the host, at least one L2P segment corresponding to the L2P segment upload request among the plurality of L2P segments.

5. The operating method of claim 2,
   further comprising determining, when the L2P map data change event occurs, whether the L2P map data changed due to the L2P map data change event is included in the one or more L2P segments registered in the sync-up list.

6. The operating method of claim 2, wherein the L2P map data change event is an event which changes a physical address mapped to a logical address within L2P map data included in the plurality of L2P segments.

7. The operating method of claim 2, wherein the L2P map data change event is at least one of a write operation, a garbage collection operation, a read reclaim operation and a wear-levelling operation.

8. The operating method of claim 1, wherein the changed L2P map data is L2P map data having the same logical address as the L2P map data included in the read command.

9. The operating method of claim 1, wherein the performing the read operation includes performing the read operation not based on the L2P map data included in the read command but based on the changed L2P map data stored in a memory of the controller.

10. The operating method of claim 1, wherein the plurality of L2P segments are read from the nonvolatile memory device and stored in a memory of the controller.

11. A memory system comprising:
    a nonvolatile memory device; and
    a controller configured to:
    register logical-to-physical (L2P) map data changed due to an L2P map data change event in a dirty list when the L2P map data is included in one or more L2P segments registered in a sync-up list,
    receive a read command from a host, and determine whether L2P map data included in the read command is registered in the dirty list, and
    perform, when the L2P map data included in the read command is determined as registered in the dirty list, a read operation on the nonvolatile memory device based on changed L2P map data among L2P map data included in a plurality of L2P segments.

12. The memory system of claim 11, wherein the controller is further configured to:
    register, in the sync-up list, at least one L2P segment that is transmitted to the host among the plurality of L2P segments each including a plurality of pieces of L2P map data in response to an L2P segment upload request of the host.

13. The memory system of claim 12, wherein the controller is further configured to:
   determine, based on the dirty list, an L2P segment including a predetermined amount or greater of changed L2P map data among the one or more L2P segments registered in the sync-up list;
   transmit at least one L2P segment, which is determined to include the predetermined amount or greater of changed L2P map data, to the host in response to a sync-up request of the host; and
   remove, from the dirty list, the changed L2P map data included in the at least one L2P segment transmitted to the host in response to the sync-up request.

14. The memory system of claim 12, wherein the controller is further configured to:
   receive the L2P segment upload request from the host; and
   transmit, to the host, at least one L2P segment corresponding to the L2P segment upload request among the plurality of L2P segments.

15. The memory system of claim 12,
   wherein the controller is further configured to determine, when the L2P map data change event occurs, whether the L2P map data changed due to the L2P map data change event is included in the one or more L2P segments registered in the sync-up list.

16. The memory system of claim 12, wherein the L2P map data change event is an event which changes a physical address mapped to a logical address within L2P map data included in the plurality of L2P segments.

17. The memory system of claim 12, wherein the L2P map data change event is at least one of a write operation, a garbage collection operation, a read reclaim operation and a wear-levelling operation.

18. The memory system of claim 11, wherein the changed L2P map data is an L2P map data of the same logical address as the L2P map data included in the read command.

19. The memory system of claim 11, wherein the controller is configured to perform the read operation not based on the L2P map data included in the read command but based on the changed L2P map data stored in a memory of the controller.

20. A data processing system comprising:
   a memory device configured to store a set of L2P map segments;
   a controller configured to cache a first subset of the set; and
   a host configured to cache a second subset of the first subset,
   wherein the controller is further configured to:
   synchronize, with the host, an L2P map segment having a predetermined amount or greater of changed L2P map data within the second subset cached therein;
   control the memory device to perform an operation based on L2P map data included in a request from the host, the L2P map data being from the synchronized L2P map segment cached in the host; and
   control the memory device to perform an operation based on L2P map data from the first subset or the set, the L2P map data being within a non-synchronized L2P map segment.

* * * * *